US011950703B2

(12) United States Patent
Marson et al.

(10) Patent No.: US 11,950,703 B2
(45) Date of Patent: Apr. 9, 2024

(54) CHANNELIZED INFLATABLE BODIES AND METHODS FOR MAKING THE SAME

(71) Applicant: Cascade Designs, Inc., Seattle, WA (US)

(72) Inventors: James Marson, Seattle, WA (US); Douglas S. Jacot, Kingston, WA (US)

(73) Assignee: Cascade Designs, Inc., Seattle, WA (US)

( * ) Notice: Subject to any disclaimer, the term of this patent is extended or adjusted under 35 U.S.C. 154(b) by 418 days.

(21) Appl. No.: 17/313,342

(22) Filed: May 6, 2021

(65) Prior Publication Data

US 2021/0251396 A1 Aug. 19, 2021

Related U.S. Application Data

(60) Division of application No. 15/642,119, filed on Jul. 5, 2017, now Pat. No. 11,013,341, which is a continuation-in-part of application No. 15/116,489, filed as application No. PCT/US2014/057563 on Sep. 25, 2014, now Pat. No. 11,019,935.

(60) Provisional application No. 61/882,622, filed on Sep. 25, 2013.

(51) Int. Cl.

| | |
|---|---|
| ***B26F 1/38*** | (2006.01) |
| ***A47C 27/08*** | (2006.01) |
| ***A47C 27/10*** | (2006.01) |
| ***B26F 1/44*** | (2006.01) |

(52) U.S. Cl.

CPC ............ *A47C 27/10* (2013.01); *A47C 27/081* (2013.01); *A47C 27/084* (2013.01); *A47C 27/088* (2013.01); *B26F 1/38* (2013.01); *B26F 1/44* (2013.01); *B26F 2210/00* (2013.01)

(58) Field of Classification Search

CPC ... A47C 27/081; A47C 27/084; A47C 27/088; A47C 27/087; A47C 27/144; A47C 27/18; B26F 1/38; B26F 1/44; B26F 2210/00

USPC .............................................................. 83/13

See application file for complete search history.

(56) References Cited

U.S. PATENT DOCUMENTS

| | | |
|---|---|---|
| 3,222,697 A | 12/1965 | Wilhelm |
| 3,286,285 A | 11/1966 | Harvey, Jr. |
| 3,918,110 A | 11/1975 | Cantillo et al. |
| 4,197,342 A | 4/1980 | Bethe |
| 4,207,636 A | 6/1980 | Ceriani |

(Continued)

FOREIGN PATENT DOCUMENTS

| | | |
|---|---|---|
| CA | 2565127 A | 7/1996 |
| CH | 704999 A | 11/2012 |

(Continued)

OTHER PUBLICATIONS

Translation, DE 20014559 U1 (Year: 2024).*

(Continued)

*Primary Examiner* — Nhat Chieu Q Do
(74) *Attorney, Agent, or Firm* — BakerHostetler

(57) ABSTRACT

An article of manufacture includes a first discrete inflatable body having a first core member cut from a single slab of core material and a first root portion, and further includes a second discrete inflatable body comprising a second core member cut from the single slab of core material and a second root portion. Each of the first and second core members includes a plurality of ribs, and the ribs extend laterally from the first and second root portions.

12 Claims, 14 Drawing Sheets

(56) References Cited

U.S. PATENT DOCUMENTS

| | | | | |
|---|---|---|---|---|
| 4,276,666 | A | 7/1981 | Yamada | |
| 4,673,452 | A | 6/1987 | Awdhan | |
| 5,282,286 | A | 2/1994 | MacLeish | |
| 5,282,288 | A | 2/1994 | Henson | |
| 5,329,656 | A | 7/1994 | Leggett | |
| 5,452,487 | A | 9/1995 | Leggett | |
| 5,761,982 | A * | 6/1998 | Abt | B26D 7/20 83/863 |
| 5,906,019 | A | 5/1999 | McCarthy et al. | |
| 5,911,657 | A | 6/1999 | Meiners | |
| 6,185,770 | B1 | 2/2001 | Wang | |
| 6,446,289 | B1 | 9/2002 | Su et al. | |
| 6,463,610 | B1 | 10/2002 | Shulte et al. | |
| 6,488,153 | B1 | 12/2002 | Morris | |
| 6,651,277 | B1 | 11/2003 | Marson | |
| 2003/0221535 | A1 * | 12/2003 | Kraus | B26D 7/1854 83/932 |
| 2004/0163178 | A1 | 8/2004 | Corneil | |
| 2004/0226100 | A1 | 11/2004 | Small et al. | |
| 2008/0276774 | A1 * | 11/2008 | Andersson | B21D 35/00 83/50 |
| 2010/0043148 | A1 | 2/2010 | Rose et al. | |

FOREIGN PATENT DOCUMENTS

| | | | | |
|---|---|---|---|---|
| DE | 20014559 | U1 * | 12/2000 | A47C 27/001 |
| EP | 0632984 | A1 | 1/1995 | |
| EP | 1472958 | A1 | 11/2004 | |
| GB | 2413488 | A | 11/2005 | |
| WO | WO-9621378 | A2 * | 7/1996 | A47C 27/144 |
| WO | WO 1999/066817 | A1 | 12/1999 | |
| WO | WO 2009/094208 | A2 | 7/2009 | |

OTHER PUBLICATIONS

International Search Report and Written Opinion for PCT Application No. PCT/US2014/057563, dated Jan. 5, 2015, 9 pages.

Baeumer Germany: "Baeumer EP (Profiling machine)", Jul. 30, 2012, XP054977965, Retrieved from the Internet: URL: https://www.youtube.com/watch?v=e80arVVU8ig (retrieved on Dec. 19, 2017).

European Supplementary Partial Search Report, EP Application No. 14849685.4, 11 pages.

* cited by examiner

CHANNELIZED INFLATABLE BODIES AND METHODS FOR MAKING THE SAME

CROSS-REFERENCE TO RELATED APPLICATIONS

This application is a divisional of U.S. patent application Ser. No. 15/642,119 filed Jul. 5, 2017, which is a continuation-in-part of U.S. patent application Ser. No. 15/116,489 filed Aug. 3, 2016, which is a 371 application of PCT/US14/57563 filed Sep. 25, 2014, which in turn claims the benefit of U.S. Prov. Patent Appl. No. 61/882,622 filed Sep. 25, 2013. All of the aforenamed applications are hereby incorporated by reference as if fully set forth herein.

BACKGROUND OF THE INVENTION

Current users of portable mattresses such as camping mattresses generally have a choice between highly insulating, self-inflating, mattresses having open cell foam cores, and highly compactable, non-self-inflating air mattresses having complicated film and/or fabric cores. Simple foam core mattresses are inexpensive to manufacture because of the core simplicity, but are comparatively bulky and heavy, while similar class air mattresses are more expensive to manufacture when attempting to achieve comparable thermal efficiencies but are not self-inflating and often fail to achieve thermal efficiency goals.

One approach to decrease weight and increase compactability of foam core mattresses has been to create holes and/or voids in the foam cores of such mattresses. While these holes and/or voids served to decrease bulk and weight while maintaining the benefits of conventional bonded mattresses technologies (e.g., high thermal efficiency and user comfort), the approach was process intensive and/or generating of waste. Examples of such approaches can be found in several self-inflating mattresses that are being of have been sold by Cascade Designs, Inc. such as the CampRest and ProLite mattress pads.

These cored or expanded foam mattresses, when subjected to internal pressures in excess of nominal, self-inflation levels, did not materially increase the mattress thickness over the core thickness. This displacement limiting functionality of the bonded form cores intentionally and beneficially prevent the "balloon effect" commonly found in pure air mattresses.

Finally, even expanded core mattresses used an initial core that was no less than 75% of the planar area of the inflatable mattress of which it would make up. This limitation, in large part, was due to the mechanical limitations of the foam slab used to form the foam core: compliance was needed to "expand" the slits that formed the voids, but too much compliance in the foam resulted in performance degradation at the foam-panel bonds.

DETAILED DESCRIPTION

Figure 1:
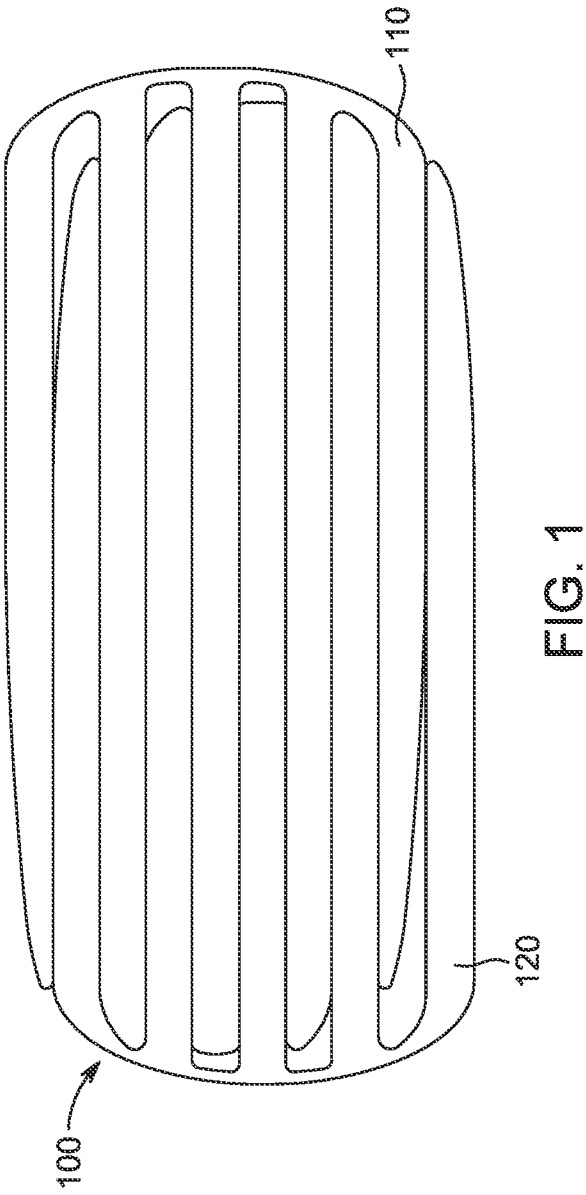
FIG. 1 is a plan view of a resilient foam slab after having been die cut to form two unitary mattress pad cores according to a first embodiment of the invention wherein each core has longitudinal channels extending from an open end to a closed end thereof (for clarity, waste material has been removed)

The invention is directed to hybrid inflatable bodies comprising opposing flexible panel portions sealed at a common perimeter thereof, and having valve means for selectively allowing fluid ingress and egress between the environment and a chamber substantially defined by inner surfaces of the flexible panels. Such inflatable bodies further comprise a core that is selectively bonded to the inner surfaces of the panel portions, characterized in that the bodies have a reduced bonded area to non-bonded area ratios and/or have elongate extending air channels extending through the inflatable body. As used herein, a panel bonded area is that area of a panel that is bonded to the core, which functions as a displacement restraining means or tensile element. For purposes of this disclosure and particularly in this respect, U.S. Pat. No. 3,872,525 issued to Lea, et al. is referenced for background purposes and is incorporated herein by reference. Additionally, elongate extending air channels are characterized as core-free channels bounded, at least in part, by opposing panels of the inflatable body (i.e., non-bonded areas) that extend in a transverse direction (i.e., normal to anticipated user-initiated compressive forces). In many preferred embodiments, the core is comprised of an open cell foam, such as an expanded or foamed polyurethane.

The reduced panel bonded area characteristics of various invention embodiments may be achieved through the use of channelized cores. Channelization in some embodiments comprises deriving two unitary cores from a single slab of core material such as foam, and in other embodiments channelization comprises deriving non-unitary cores from a single half slab of core material, while in still other embodiment channelization comprises deriving at least one unitary core and at least one part of a non-unitary core from a single slab of core material (as well as several non-unitary cores in addition to the unitary core). As used herein, the term "non-unitary" means a core structure comprising a plurality of discrete core elements that, when integrated into an inflatable body, constitute a singular core.

For embodiments wherein a single slab yields two unitary cores, a preferred core geometry is one characterized as having a root or spine portion from which extend a plurality of ribs, wherein the ribs partially define future elongate extending air channels when the core is integrated with the opposing panel portions, as previously described. By slitting or otherwise cutting such a core from a slab, it is possible to create a second core by limiting the distance of rib extensions, i.e., prior to reaching the opposing side of the slab. In this case, removal of the ribs from a first core from the slab forms the channels of a second core and vice versa. The result is a pair of cores that have three substantially contiguous sides and a highly variegated side (i.e., the rib terminating side or side opposite the root/spine—hereinafter "the terminal side"). Since symmetry is preferred about the medial sagittal plane (lateral symmetry), the ribs preferably extend longitudinally in an elongate inflatable body, which then places the root/spine-terminal side asymmetry in the longitudinal direction. In the art of mattress pads, the terminal side may advantageously form an integrated pillow for a user, for reasons that will be described in greater detail below.

For embodiments wherein a half slab yields a single core, a preferred geometry is one characterized as having a mirrored geometry, such as a medial sagittal plane mirror (laterally symmetrical). In such embodiments, a root/spine and rib arrangement is created, however, the direction of rib extension in the core is preferably lateral as opposed to longitudinal if the slab is not symmetrical in both x and y axes, and by implication, the root/spine extends longitudinally. In some embodiments, the root/spines are centrally (medially) located within the inflatable body while in other embodiments, they are peripherally (laterally) located.

The use of channelized foam cores not only results in inflatable bodies having decreased densities over equivalent sized conventional foam core self-inflating bodies, but also notable increases compactability. Moreover, the presence of elongate extending air channels permits localized "ballooning" of the opposing panel portions, thereby increasing the sectional thickness of the inflatable body thereat, and often time perceived user comfort. Because this ballooning effect is only present at the air channels, which are necessarily at least partially defined by the foam core, their location, frequency, geometry (rectilinear, curvilinear, or combinations thereof), the characteristics of each air channel can all be precisely established. With respect to the variegated side of certain foam core embodiments, the comparatively unbonded portion of the inflatable body thereat will balloon to a greater degree than other perimeter portions of the inflatable body and conveniently form a pillow-like structure.

Because a comparatively large portion of the opposing panels are not bonded to the foam core in view of the prior art, which results in material panel distension, the edges of the foam cores-panel interfaces thereat are subjected to greater shear or peeling forces. Additionally, the previously noted ballooning effect imparts greater tension forces in the foam care, particularly adjacent to the elongate extending air channels. As a consequence, a high tensile strength open cell foam material is preferably used and/or consideration is given to core thickness versus channel widths.

To increase the thermal performance of inflatable bodies according to the invention embodiments, the inner surfaces of the panels that form the inflatable body can be aluminized or otherwise treated with a radiant energy reflective treatment. Additionally, serpentine films or "gapped" films can be disposed between the foam core and panels to decrease convective heat transfer. These films can also be treated with a radiant energy reflective treatment to further limit radiant heat transfer.

For purposes of this patent, the terms "area", "boundary", "part", "portion", "surface", "zone", and their synonyms, equivalents and plural forms, as may be used herein and by way of example, are intended to provide descriptive references or landmarks with respect to the article and/or process being described. These and similar or equivalent terms are not intended, nor should be inferred, to delimit or define per se elements of the referenced article and/or process, unless specifically stated as such or facially clear from the several drawings and/or the context in which the term(s) is/are used.

FIG. 1 is a plan view of a resilient foam slab 100 after having been die cut to form two unitary mattress pad cores 110, 120 according to a first embodiment of the invention (for clarity, waste material produced in forming the pad cores is not illustrated).

Figure 2:
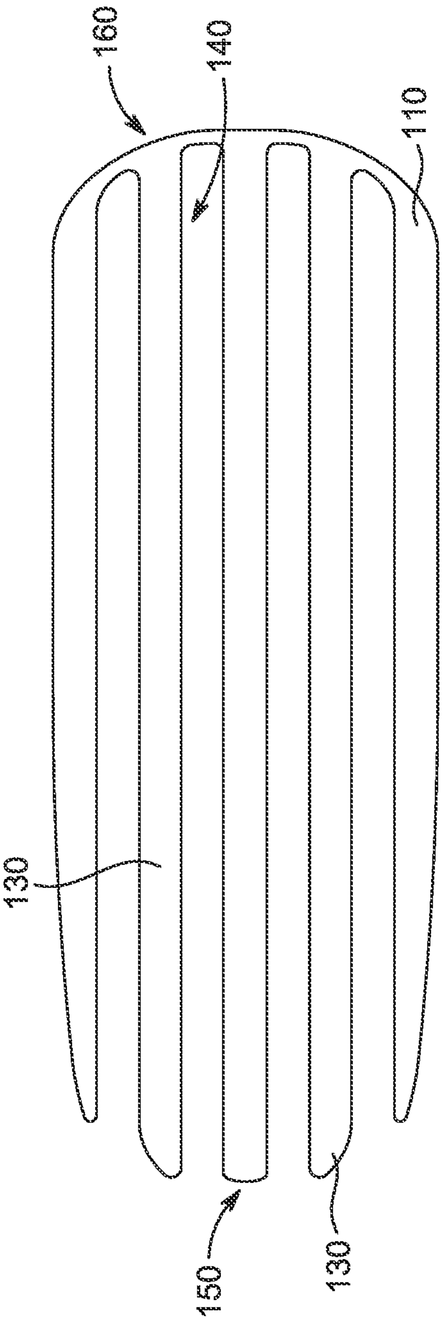
FIG. 2 is a plan view of one of the two mattress pad cores established in FIG. 1.

FIG. 2 is a plan view of a pad core 110 produced from the slab 100 illustrated in FIG. 1. Core 110 has longitudinal ribs 130 defining channels 140 extending from an open end 150 to a closed end 160 thereof.

Figure 3:
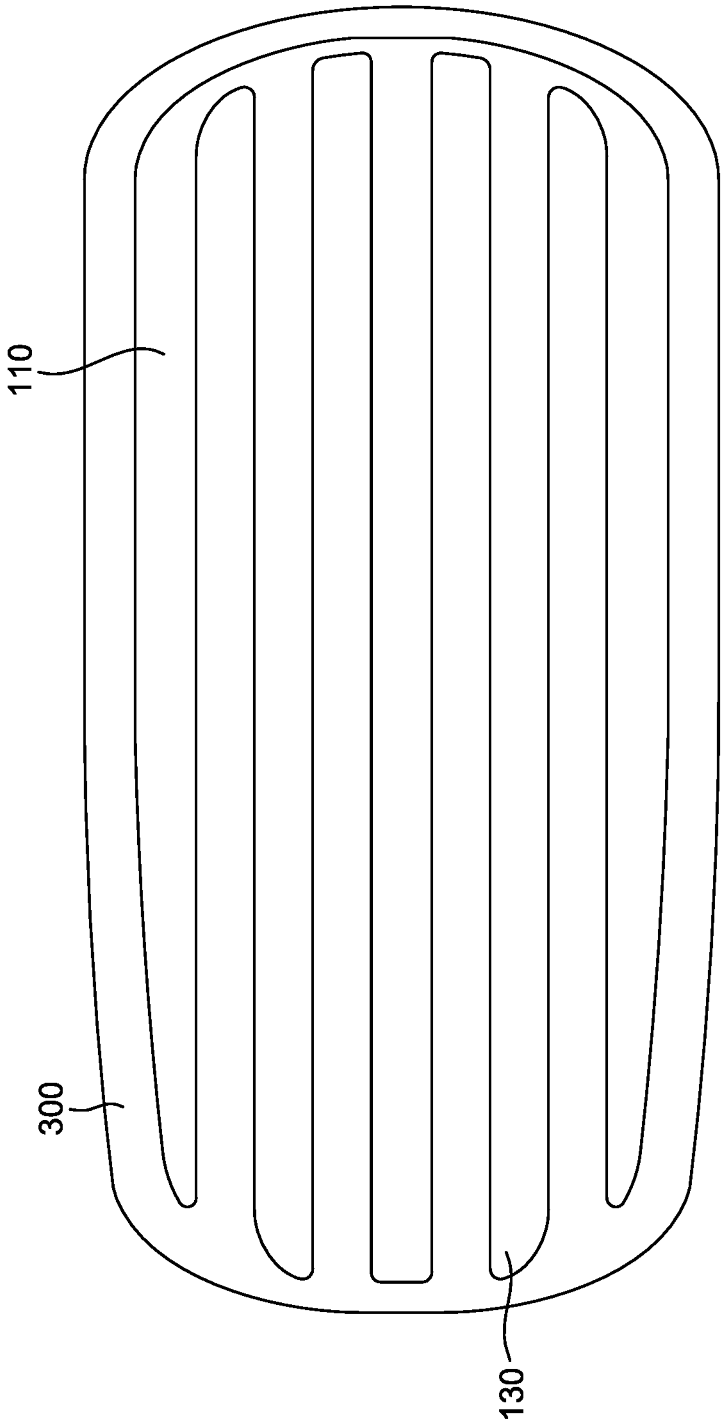
FIG. 3 shows the core of FIG. 2 within an envelope defined by an inflatable body, wherein the facing surfaces of the core have been adhesively bonded to the inner surfaces of the envelope (for clarity, only the perimeter of the inflatable body is shown)

FIG. 3 shows the core 110 of FIG. 2 within an envelope 300 defined by an inflatable body, wherein the ribs 130 of the core have been adhesively bonded to the inner surfaces of the envelope (for clarity, only the perimeter of the inflatable body is shown).

Figure 4:
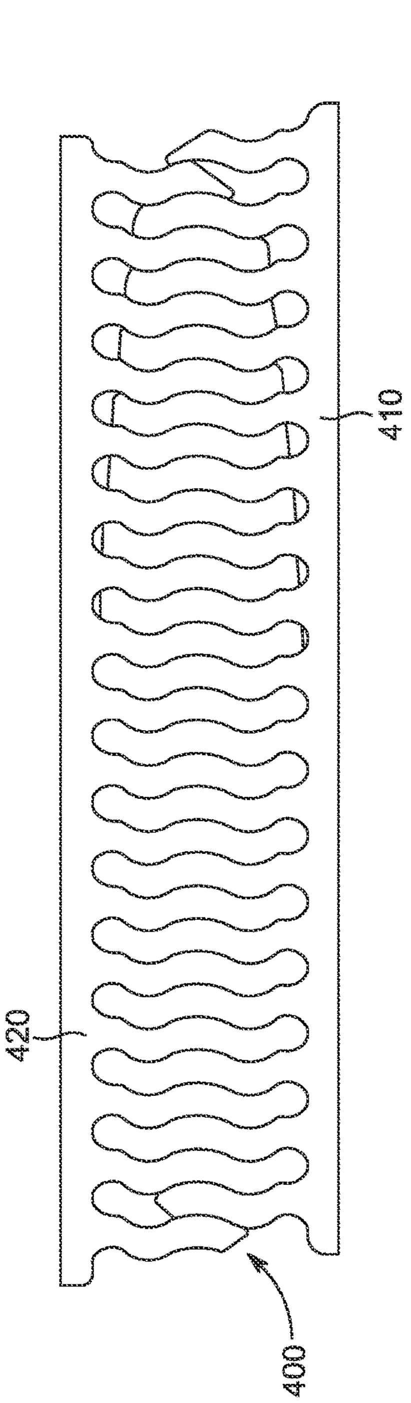
FIG. 4 is a plan view of a resilient foam slab after having been die cut to form a single non-unitary mattress pad core according to a second embodiment of the invention, wherein each half core has lateral channels extending from a lateral open side to a closed medial side thereof when the cores are configured and assembled for use (for clarity, waste material has been removed)

FIG. 4 is a plan view of a resilient foam slab 400 after having been die cut to form two half cores 410, 420 used to assemble a single non-unitary mattress pad core 500 (FIG. 5) according to a second embodiment of the invention (for clarity, waste material produced in forming the pad cores is not illustrated).

Figure 5:
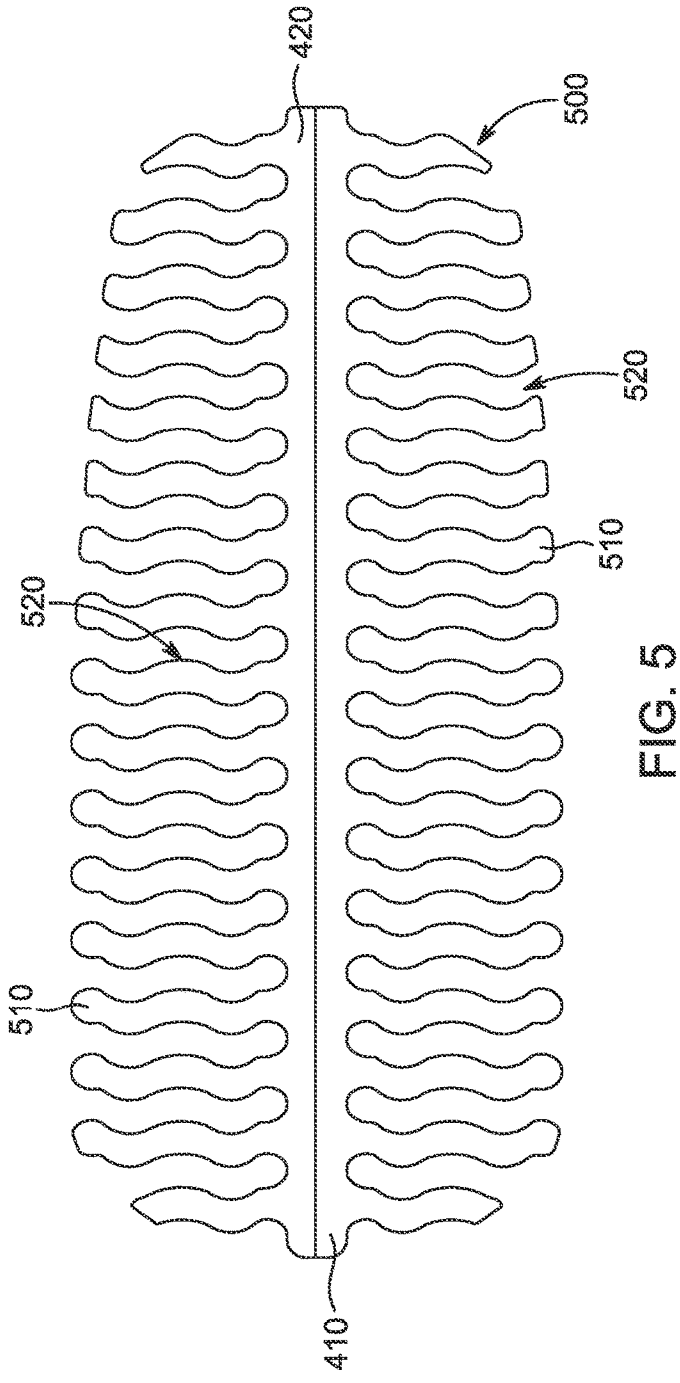
FIG. 5 is a plan view of the non-unitary core of FIG. 4 when the two halves are configured and assembled for use, particularly by positioning the closed medial sides of the half cores adjacent to each other.

FIG. 5 is a plan view of core 500 when the two half cores 410, 420 are configured and assembled for use, particularly by positioning the closed medial sides (edges) of the half cores adjacent to each other. Each half core 410, 420 has lateral sinusoidal ribs 510 defining channels 520 extending from a lateral open side to a closed medial side thereof when the cores are configured and assembled for use.

Figure 6:
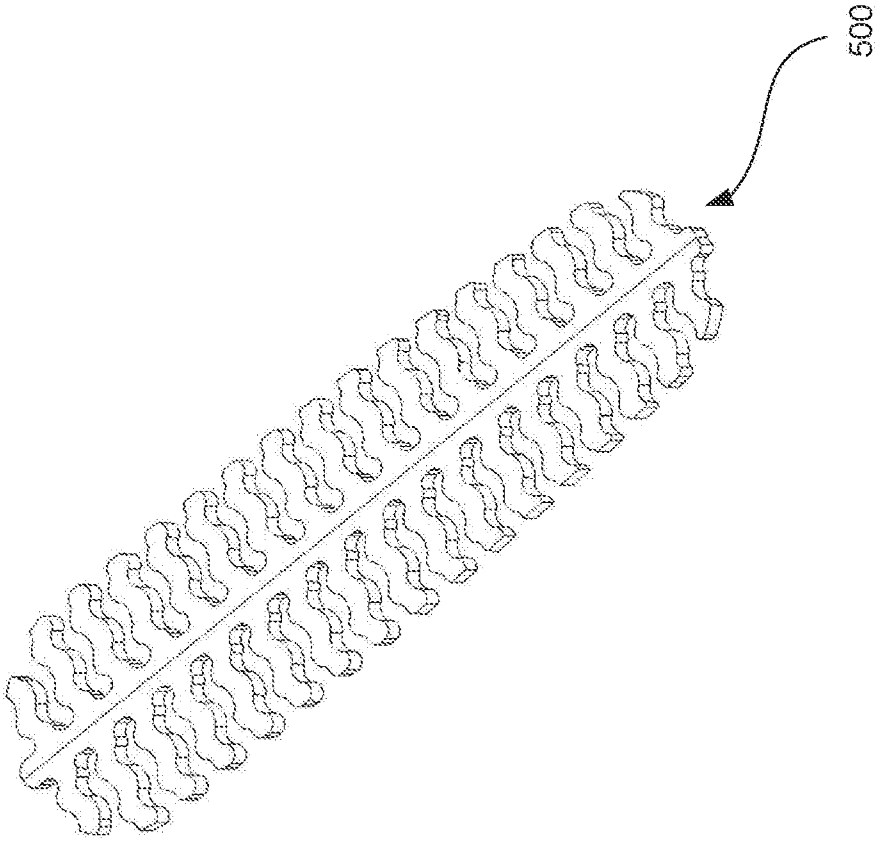
FIG. 6 is a perspective view of the configured and assembled core shown in FIG. 5.

FIG. 6 is a perspective view of the configured and assembled core shown in FIG. 5.

Figures 7, 8:
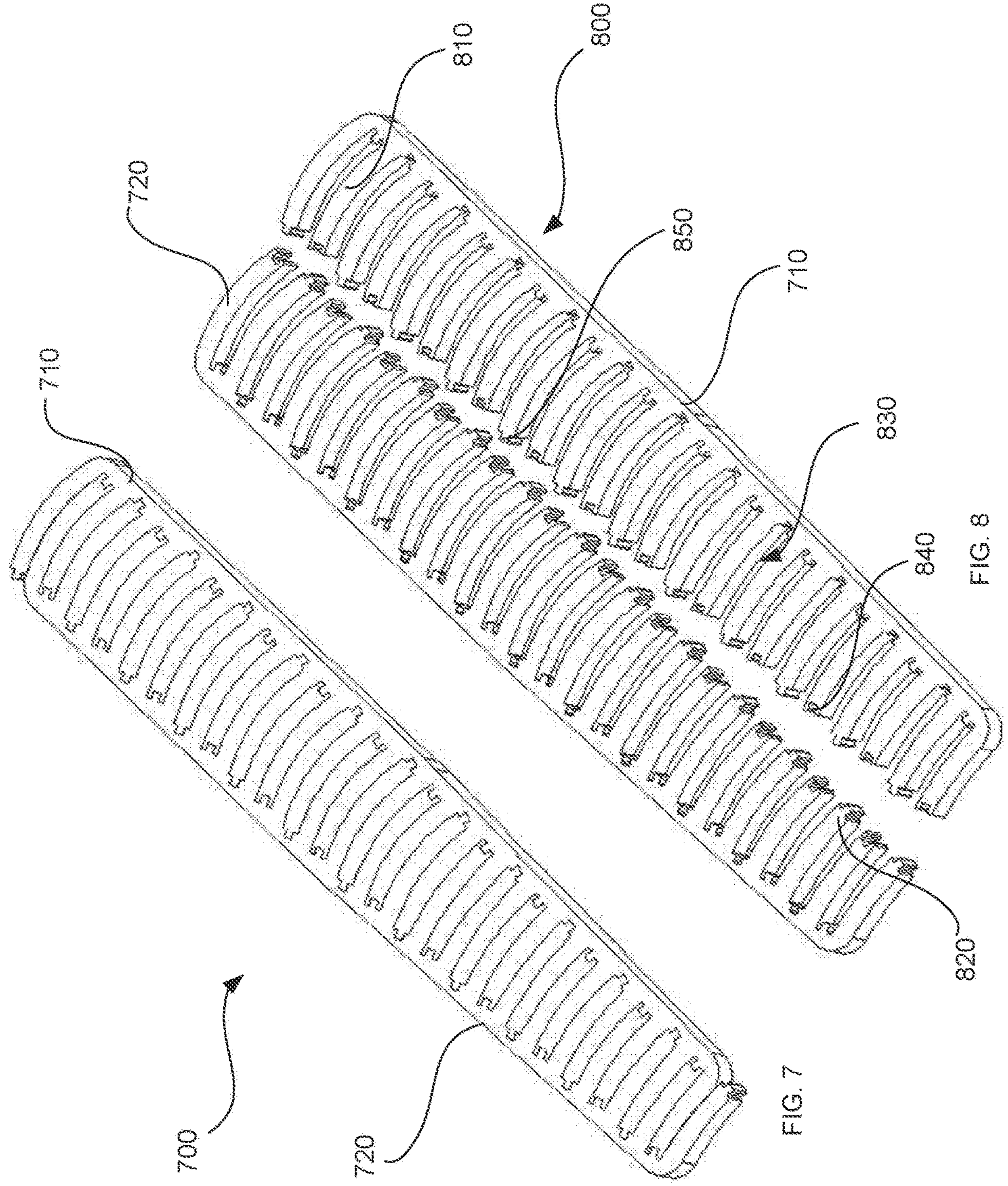
FIG. 7 is a generally plan view of a resilient foam slab after having been die cut to form a single non-unitary mattress pad core according to a third embodiment of the invention, wherein each half core has lateral channels extending from a medial open side to a closed lateral side thereof when the cores are configured and assembled for use (for clarity, waste material has been removed)
FIG. 8 is a generally plan view of the non-unitary core of FIG. 7 when the two halves have been separated and just prior to linkage of the ribs that define the lateral channels.

FIG. 7 is a perspective view of a resilient foam slab 700 after having been die cut to form two half cores 710, 720 used to assemble a single non-unitary mattress pad core 800 (FIG. 8) according to an embodiment of the invention, (for clarity, waste material produced in forming the pad cores is not illustrated).

FIG. 8 is an exploded perspective view of a non-unitary core 800 when the two half cores 710, 720 of FIG. 7 have been separated and just prior to linkage of the ribs 810, 820 that define lateral channels 830 extending from a medial open side to a closed lateral side thereof when the cores are configured and assembled for use. Ribs 810, 820 include recessed female portions 840 and male portions 850. Male portion 850 is configured to couple with a corresponding female portion 840.

Figure 9:
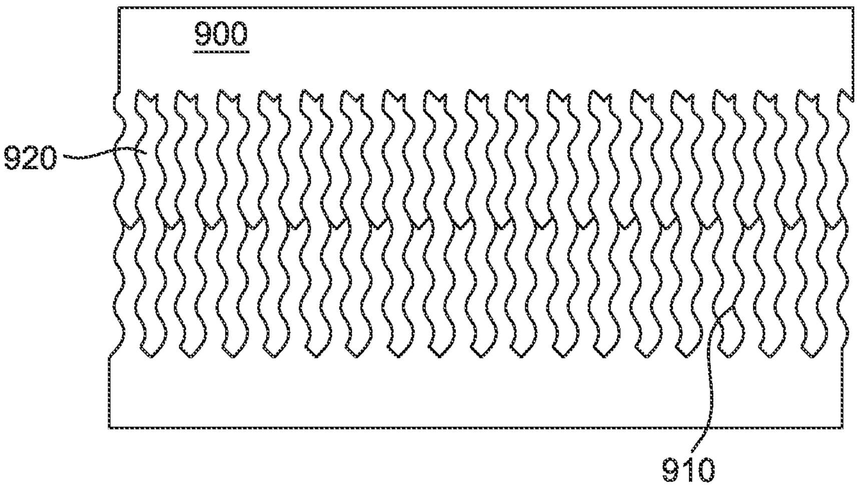
FIG. 9 illustrates an alternative geometry to that of FIGS. 7 and 8 wherein the ribs (and consequently the channels) have a sinusoidal form.

FIG. 9 illustrates an alternative-geometry pad core 900 formed from a unitary foam slab, the ribs 910 (and consequently the channels 920) of which have a sinusoidal form.

Figure 10:
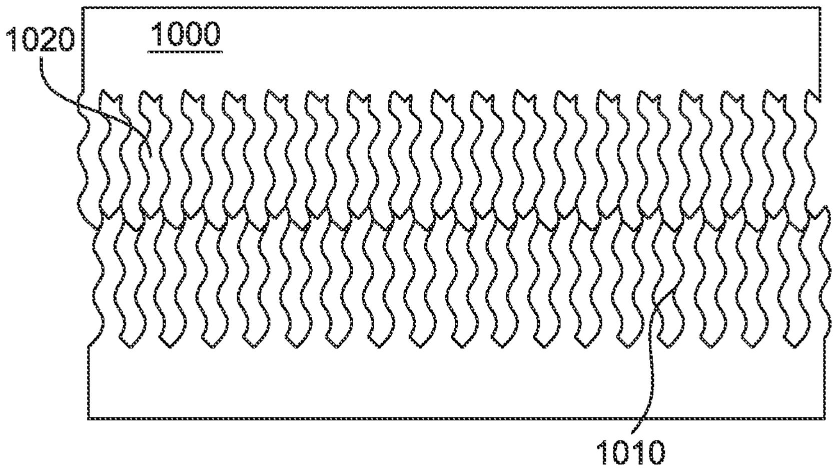
FIG. 10 illustrates an alternative geometry to that of FIGS. 7 and 8 wherein the ribs (and consequently the channels) have a sinusoidal form but differs from that of FIG. 9 insofar as the channels formed by the ribs do not extend from one lateral side to the other lateral side.

FIG. 10 illustrates an alternative-geometry pad core 1000 formed from a unitary foam slab, the ribs 1010 (and consequently the channels 1020) of which have a sinusoidal form. Core 1000 differs from core 900 insofar as the channels 1020 formed by the ribs 1010 do not extend from one lateral side to the other lateral side.

Figure 20:
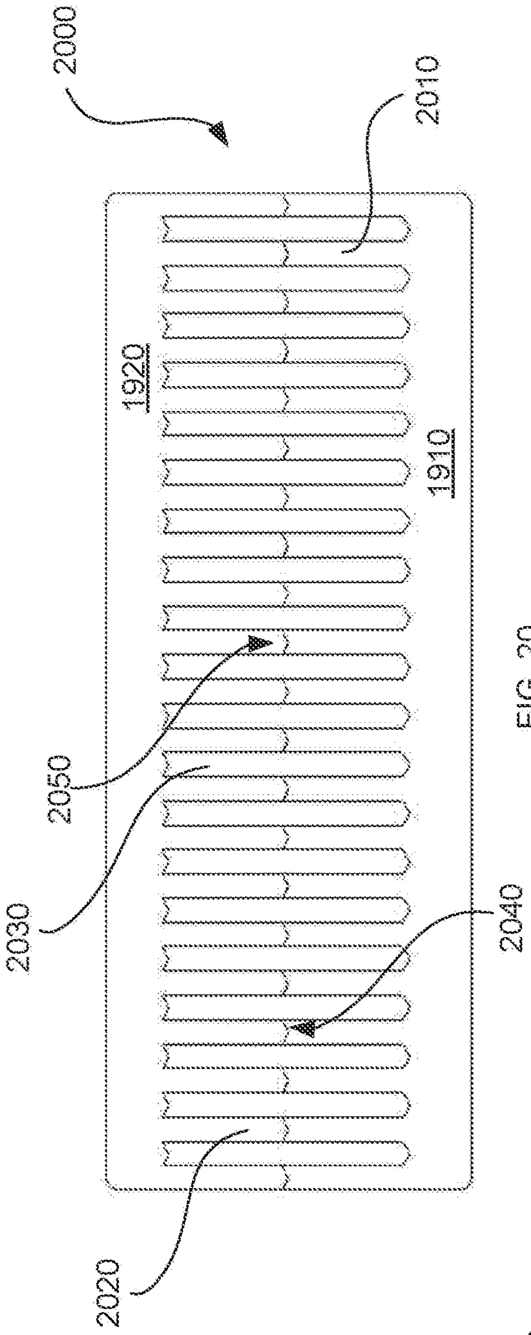
FIGS. 19-20 illustrate an alternative-geometry pad core formed from a unitary foam slab and a step in creating such core.
Figure 19:
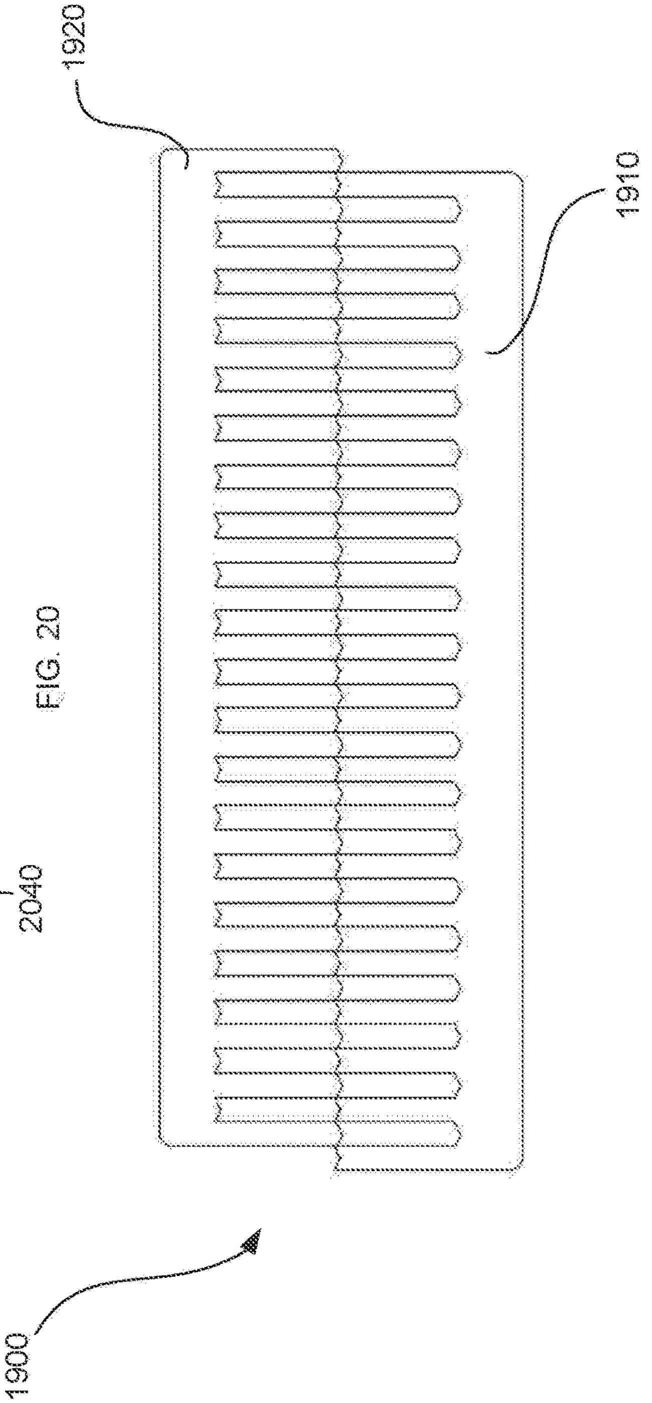

FIGS. 19-20 illustrate an alternative-geometry pad core 2000 formed from a unitary foam slab 1900 and a step in creating such core. More specifically, FIG. 19 is a top view of a resilient foam slab 1900 after having been die cut to form two half cores 1910, 1920 and as the half cores are being separated from one another. Cores 1910, 1920 are used to assemble a single non-unitary mattress pad core 2000 (FIG. 20) according to an embodiment of the invention.

FIG. 20 is top view of the core 2000 after the two half cores 1910, 1920 of FIG. 19 have been separated from one another and are linked. Ribs 2010, 2020 of the cores 1910, 1920 define lateral channels 2030 extending from a medial open side to a closed lateral side thereof. Ribs 2010 include recessed female portions 2040, and ribs 2020 include male portions 2050. Male portion 2050 is configured to couple with a corresponding female portion 2040.

Figure 11:
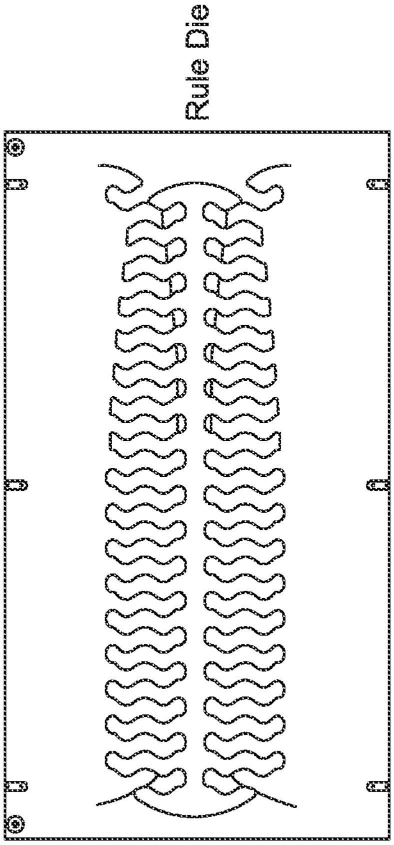
FIG. 11 is a plan view of a rule dies for creating a fourth embodiment of the invention, whereby a unitary mattress core is created from a single slab of core material in addition to partial cuts for two other unitary mattress cores or two half cores for a non-unitary mattress core.

FIG. 11 is a plan view of a rule dies for creating an embodiment of the invention, whereby a unitary mattress core is created from a single slab of core material in addition to partial cuts for two other unitary mattress cores or two half cores for a non-unitary mattress core.

Figure 12:
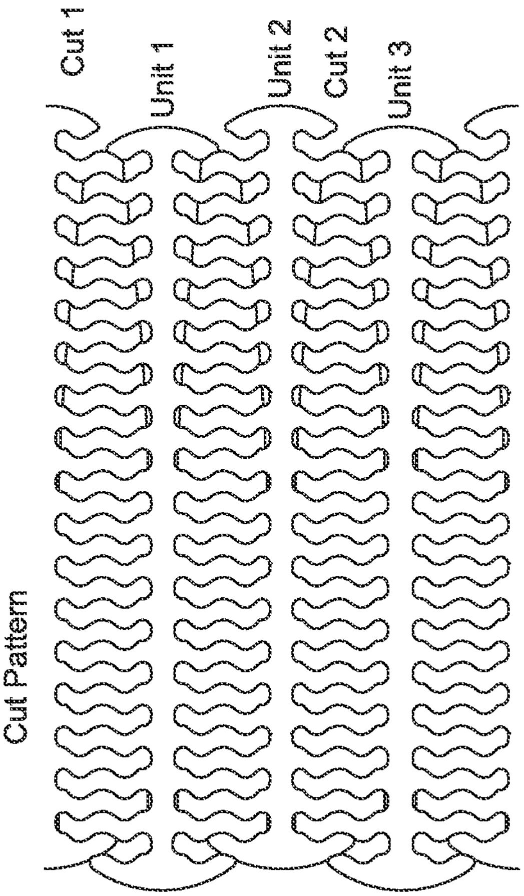
FIG. 12 shows the resulting cut pattern of the rule die of FIG. 11 when applied to either a single slab of core material and twice cut to form three unitary cores and two half cores, or to two slabs of core material and each single cut to yield two unitary cores and two non-unitary cores.

FIG. 12 shows the resulting cut pattern of the rule die of FIG. 11 when applied to either a single slab of core material and twice cut to form three unitary cores and two half cores, or to two slabs of core material and each single cut to yield two unitary cores and two non-unitary cores.

Figure 13:
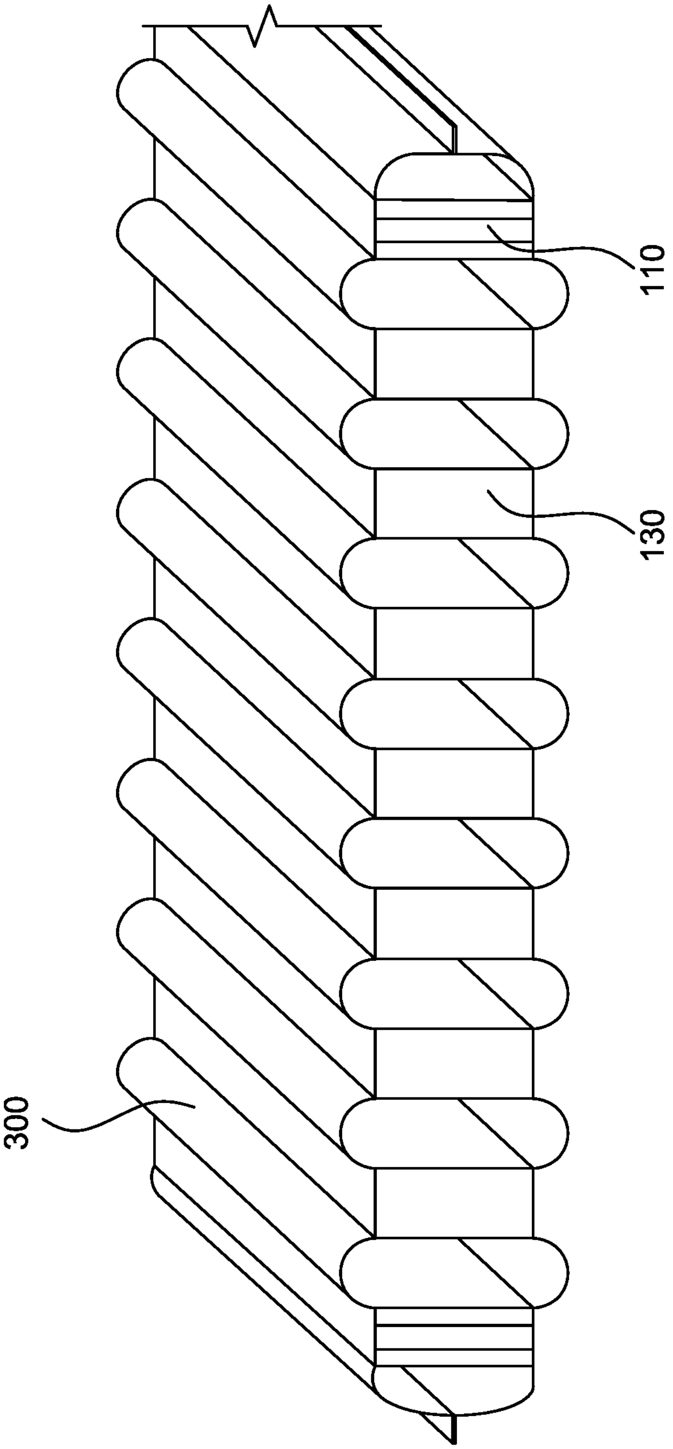
FIG. 13 is a cross section in perspective of an inflatable mattress according to the first embodiment and generally shown in FIG. 3, wherein the unbonded panels comprising the envelope of the inflatable body are allowed to displace upon inflation of the body.

FIG. 13 is a cross section in perspective of an inflatable mattress according to the first embodiment and generally shown in FIG. 3, wherein the unbonded panels comprising the envelope 300 of the inflatable body are allowed to displace upon inflation of the body.

Figure 14:
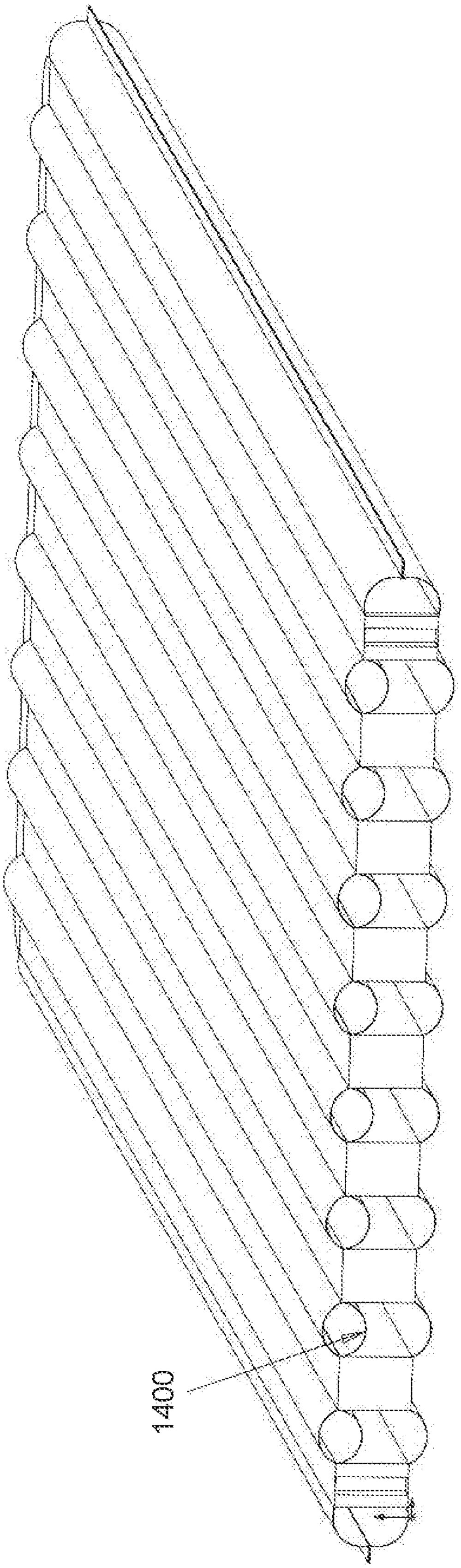
FIG. 14 shows a derivative embodiment to that of FIG. 13 wherein a thermal film barrier is established intermediate the outer panel and the inner channel, and is kept open at an end of the mattress for proper inflation to form a gapped barrier.

FIG. 14 shows a derivative embodiment to that of FIG. 13 wherein a thermal film barrier 1400 is established intermediate the outer panel and the inner channel, and is kept open at an end of the mattress for proper inflation to form a gapped barrier.

Figure 15:
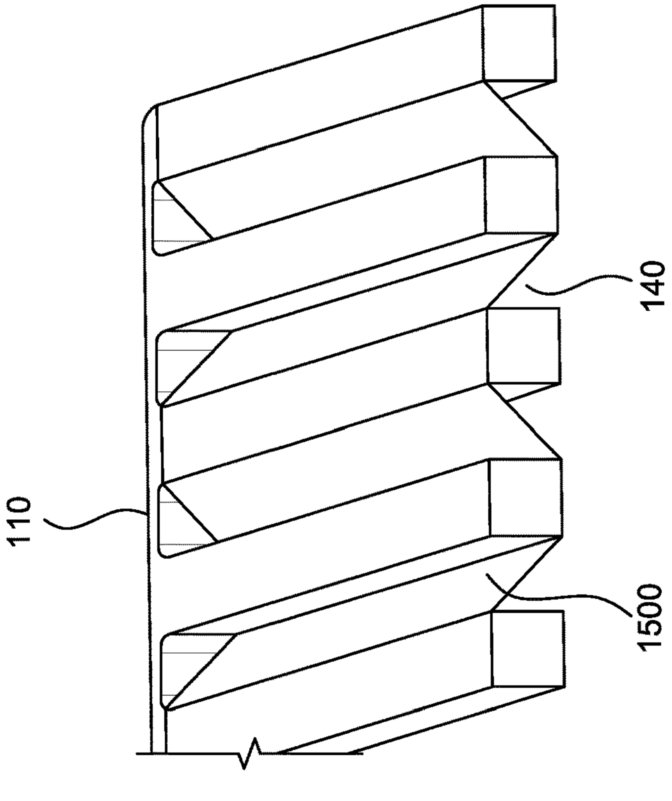
FIG. 15 illustrates a construction step for introducing a serpentine metalized film within the channels defined by the mattress core.

FIG. 15 illustrates a construction step for introducing a serpentine metalized film 1500 within the channels 140 defined by the mattress core 110.

Figure 16:
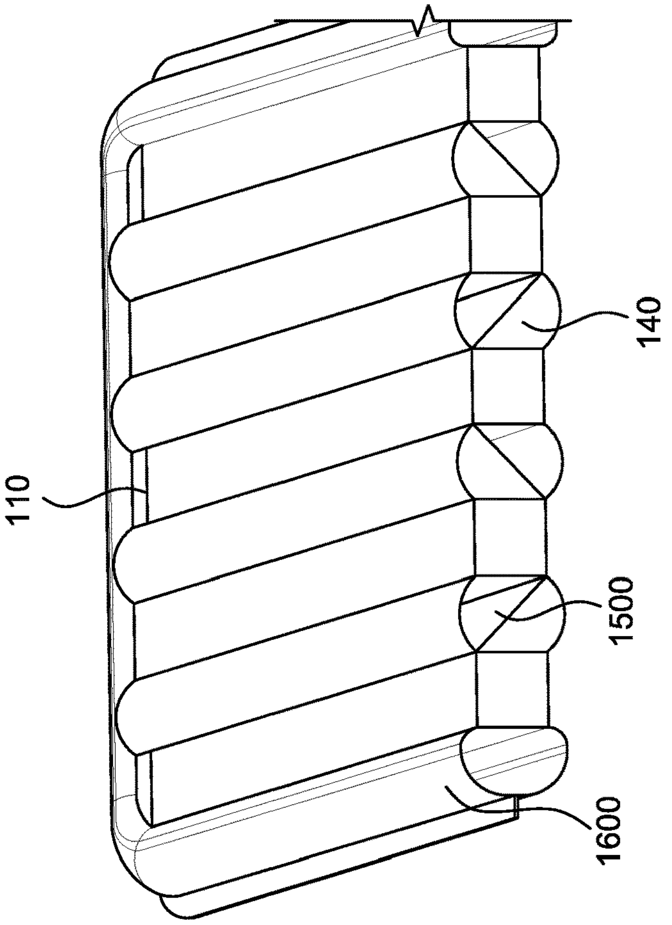
FIG. 16 illustrates a construction step subsequent to that of FIG. 15, wherein the outer panels that comprise the mattress envelope are adhered to the core and film to form bi-layer channels.

FIG. 16 illustrates a construction step subsequent to that of FIG. 15, wherein the outer panels 1600 that comprise the mattress envelope are adhered to the core 110 and film 1500 to form bi-layer channels 140.

Figure 17:
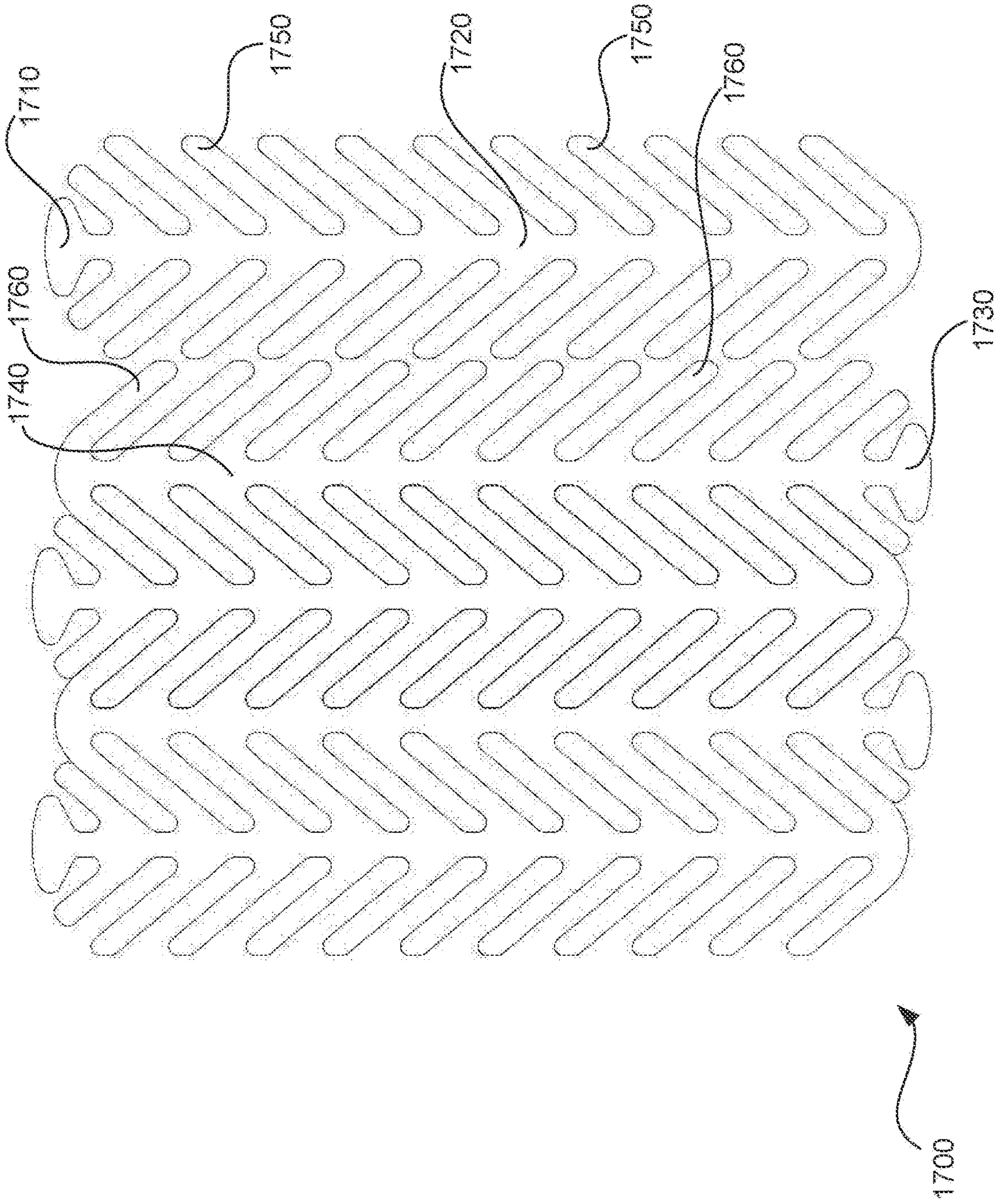
FIG. 17 illustrates a step in constructing multiple inflatable bodies from a single slab of core material.

FIG. 17 illustrates a step in constructing multiple inflatable bodies from a single slab 1700 of core material such as foam. Specifically, a first core member 1710 having a first root portion 1720 and a second core member 1730 having a second root portion 1740 are cut from the slab 1700. Each of the first and second core members 1710, 1730 respectively includes a plurality of ribs 1750, 1760. The ribs 1750, 1760 extend laterally from the first and second root portions 1720, 1740 and, in an embodiment, extend from the root portions at an oblique angle with respect to the root portions. In the illustrated embodiment, each of the ribs 1750, 1760 extends parallel to at least one of another of the ribs. Additionally, and in an embodiment, the ribs 1750, 1760 extending from the root portions 1720, 1740 are progressively longer from a first end to the second end of each root portion.

Figure 18:
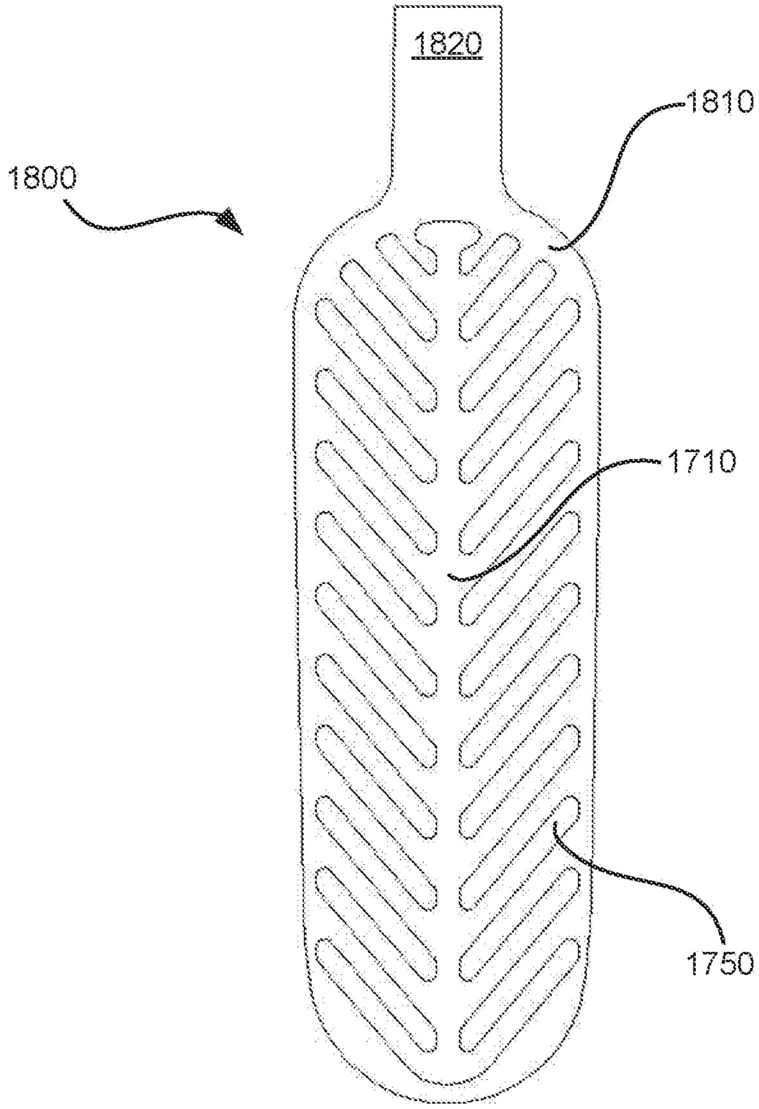
FIG. 18 illustrates an inflatable body according to an embodiment.

As best shown in FIG. 18, an inflatable body 1800 may be completed by enclosing the first core member 1710 within at least one flexible panel 1810. In an embodiment, the at least one panel 1810 is bonded to the ribs 1750. The body 1800 may be inflated/deflated through a valve portion 1820 formed through panel 1810.

Figure 21:
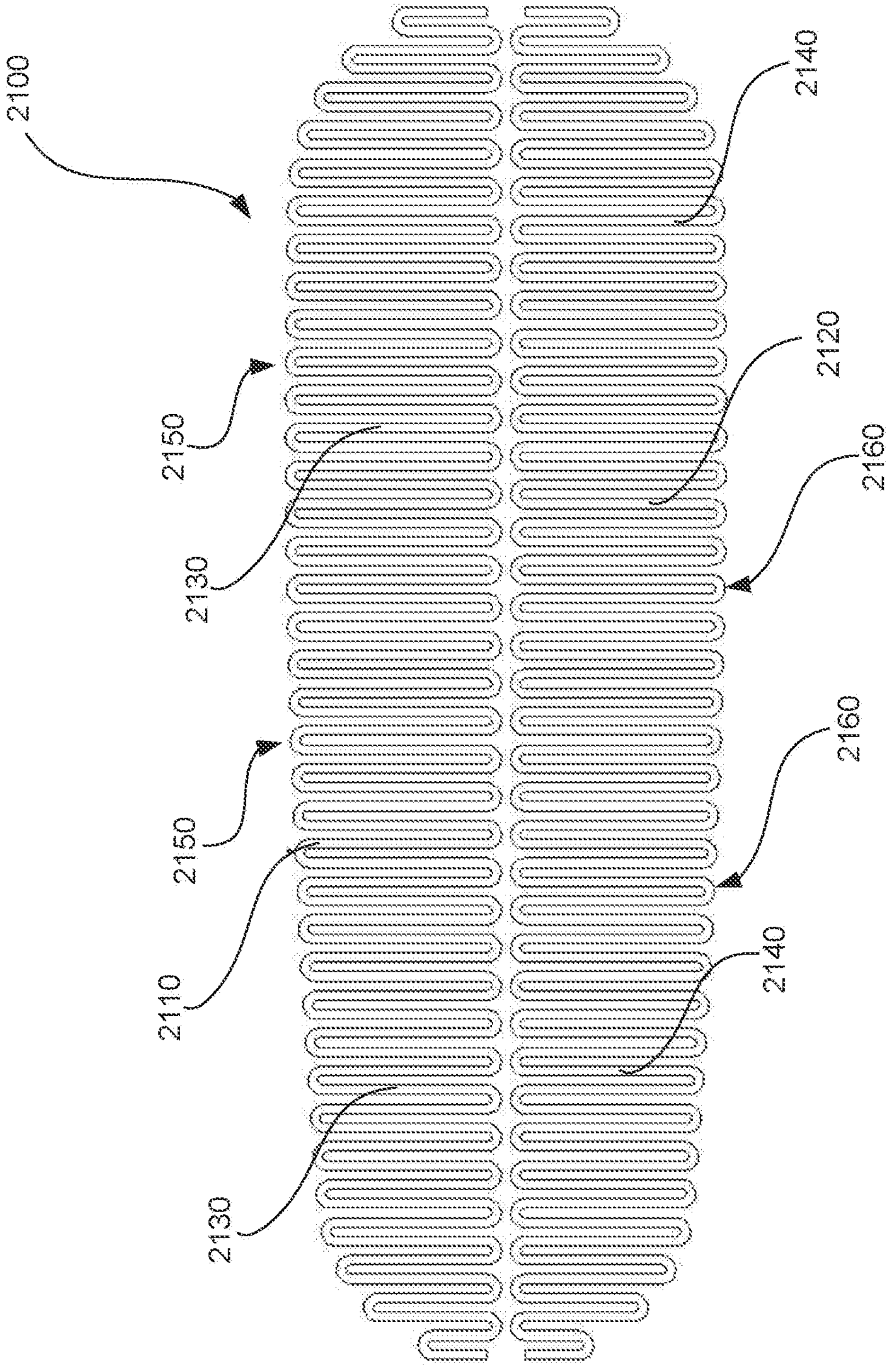
FIG. 21 illustrates a core assembly according to an embodiment.

Referring now to FIG. 21, a core assembly 2100 is show that, once inserted into at least one flexible panel as described above herein, can form part of an inflatable mattress having a valve portion (not shown) similar to valve portion 1820 discussed above herein according to an embodiment. Assembly includes first and second core members 2110, 2120, each having a plurality of linear segments 2130, 2140, respectively, interconnected by a set of bent segments 2150, 216, respectively. In the illustrated embodiment, each linear segment 2130, 2140 is parallel to at least one other linear segment. In one or more embodiments, the first and second core members 2110, 2120 are cut from the same slab of core material and the core members are coupled to each other.

It will be apparent to those skilled in the art that various modifications and variations can be made in the present invention without departing from the spirit or scope of the invention. Thus, it is intended that the present invention cover the modifications and variations of the invention provided they come within the scope of the appended claims and their equivalents.

What is claimed is:

1. A method of creating multiple mattress cores for inflatable mattresses, comprising:

creating a rule die configured to cut a unitary mattress core from a single slab of core material;

cutting at least a first unitary mattress core from the single slab of core material with the rule die, the first unitary mattress core including a first root portion and a first plurality of ribs extending laterally from the first root portion;

positioning the rule die next to the first unitary mattress core;

cutting a second unitary mattress core from the single slab of core material with the rule die, the second unitary mattress core including a second root portion and a second plurality of ribs extending laterally from the second root portion; and separating the first unitary mattress core from the second unitary mattress core, wherein after the first unitary mattress core is separated from the second unitary mattress core, a plurality of first channels are formed, each first channel being formed between adjacent ribs among the first plurality of ribs when some of the second plurality of ribs are removed, and a plurality of second channels are formed, each second channel being formed between adjacent ribs among the second plurality of ribs when some of the first plurality of ribs are removed.

2. The method of claim 1, wherein the rule die cuts only a single unitary mattress core per cut.

3. The method of claim 1, wherein the rule die cuts a single unitary mattress core and at least one partial mattress core per cut.

4. The method of claim 1, wherein positioning includes reversing the position of the rule die before cutting the second unitary mattress core.

5. The method of claim 4, wherein the first plurality of ribs extend from the first root portion at an angle in a first direction and the second plurality of ribs extend from the second root portion at the angle in a second direction opposite the first direction.

6. The method of claim 1, wherein the first plurality of ribs and the second plurality of ribs are sinusoidal.

7. The method of claim 1, wherein cutting at least a first unitary mattress core includes cutting a portion of an additional mattress core.

8. The method of claim 7, wherein the additional mattress core is the second unitary mattress core.

9. The method of claim 1, wherein each rib among the first plurality of ribs has a width, and wherein positioning the rule die includes shifting the rule die by the width of one rib.

10. The method of claim 1, further comprising positioning the rule die next to the second unitary mattress core;

cutting a third unitary mattress core from the single slab of core material with the rule die, the third unitary mattress core including a third root portion and a third plurality of ribs extending laterally from the third root portion.

11. The method of claim 10, wherein each rib among the first plurality of ribs and the second plurality of ribs has a width, wherein positioning the rule die next to the first unitary mattress core includes shifting the rule die by the width of one rib in a first direction, and where in positioning the rule die next to the second unitary mattress core includes shifting the rule die by the width of the one rib in a second direction opposite the first direction.

12. The method of claim 11, wherein separating further includes separating the second unitary mattress core from the third unitary mattress core, wherein after the second unitary mattress core is separated from the third unitary mattress core, a plurality of additional second channels are formed between the adjacent ribs among the second plurality of ribs when some of the third plurality of ribs are removed, and a plurality of third channels are formed, each third channel being formed between adjacent ribs among the third plurality of ribs when some of the second plurality of ribs are removed.

* * * * *